(12) United States Patent
Wiley

(10) Patent No.: US 8,979,396 B2
(45) Date of Patent: Mar. 17, 2015

(54) SIDE PUMP FIBER, METHOD OF MAKING SAME, AND OPTICAL DEVICES USING SAME

(71) Applicant: 3SAE Technologies, Inc., Franklin, TN (US)

(72) Inventor: Robert G. Wiley, Franklin, TN (US)

(73) Assignee: 3SAE Technologies, Inc., Franklin, TN (US)

( * ) Notice: Subject to any disclaimer, the term of this patent is extended or adjusted under 35 U.S.C. 154(b) by 0 days.

(21) Appl. No.: 14/511,552

(22) Filed: Oct. 10, 2014

(65) Prior Publication Data

US 2015/0023639 A1  Jan. 22, 2015

Related U.S. Application Data

(62) Division of application No. 13/365,841, filed on Feb. 3, 2012, now Pat. No. 8,858,096.

(60) Provisional application No. 61/439,124, filed on Feb. 3, 2011.

(51) Int. Cl.
   *G02B 6/255* (2006.01)
   *G02B 6/25* (2006.01)
   *G02B 6/02* (2006.01)

(52) U.S. Cl.
   CPC ....... *G02B 6/255* (2013.01); *G02B 6/25* (2013.01); *G02B 6/02* (2013.01)
   USPC .................. 385/96; 385/43; 385/45; 385/50; 359/341.3

(58) Field of Classification Search
   CPC ............ G02B 6/2852; H01S 3/094019; H01S 3/06745; H01S 3/06708; H01S 3/094007; H01S 3/09408
   USPC ............... 385/43, 45, 46, 50, 95–96, 123; 359/341.1, 341.3
   See application file for complete search history.

(56) References Cited

U.S. PATENT DOCUMENTS

| | | | |
|---|---|---|---|
| 4,673,243 | A | 6/1987 | Yamashita et al. |
| 5,185,758 | A | 2/1993 | Fan et al. |
| 5,268,978 | A | 12/1993 | Po et al. |
| 5,864,644 | A | 1/1999 | DiGiovanni et al. |
| 6,370,297 | B1* | 4/2002 | Hakimi et al. .................. 385/27 |
| 6,434,302 | B1 | 8/2002 | Fidric et al. |

(Continued)

FOREIGN PATENT DOCUMENTS

| | | |
|---|---|---|
| KR | 10-2010-0048689 | 5/2010 |
| WO | 2012/106624 | 8/2012 |

OTHER PUBLICATIONS

International Search Report and Written Opinion dated Sep. 21, 2012 issued in corresponding Application No. PCT/US2012/023818.

(Continued)

*Primary Examiner* — Daniel Petkovsek
(74) *Attorney, Agent, or Firm* — Onello & Mello, LLP.

(57) ABSTRACT

A side pump fiber and a method of making a side pump fiber are provided. A plurality of pump fibers can be joined to a side of a signal fiber, at different locations. The method includes creating a lengthwise, tapered, concave pocket cut in a pump (or side pump) fiber, inserting the signal fiber in the pocket cut, and then coupling the side pump fiber to the center fiber at the pocket cut. Optical amplifiers and lasers, as examples, can be made using the above method and side pump fibers.

11 Claims, 9 Drawing Sheets

(56) References Cited

U.S. PATENT DOCUMENTS

| | | |
|---|---|---|
| 7,046,432 B2 * | 5/2006 | Starodoumov ........... 359/341.32 |
| 7,161,966 B2 | 1/2007 | Schlueter et al. |
| 7,277,612 B2 | 10/2007 | Sintov |
| 7,327,920 B2 | 2/2008 | Dong et al. |
| 7,455,464 B2 | 11/2008 | Tammela et al. |
| 7,720,340 B2 | 5/2010 | Lewis et al. |
| 7,957,432 B2 | 6/2011 | Seo et al. |
| 7,978,943 B2 * | 7/2011 | Rockwell et al. ............... 385/43 |
| 8,346,038 B2 | 1/2013 | Gonthier |
| 8,787,716 B2 * | 7/2014 | Kumkar et al. ................. 385/43 |
| 8,858,096 B2 * | 10/2014 | Wiley .............................. 385/96 |
| 2010/0111118 A1 | 5/2010 | Seo et al. |
| 2011/0123155 A1 | 5/2011 | Kumkar et al. |

OTHER PUBLICATIONS

"Side Pump Fiber, Method of Making Same, and Optical Devices Using Same" Specification, Drawings, Claims and Prosecution History, of U.S. Appl. No. 13/365,841, filed Feb. 3, 2012, by inventor(s).

\* cited by examiner

SIDE PUMP FIBER, METHOD OF MAKING SAME, AND OPTICAL DEVICES USING SAME

CROSS REFERENCE TO RELATED APPLICATIONS

This application is a divisional application of U.S. patent application Ser. No. 13/365,841, filed on Feb. 3, 2012, which claims the benefit under 35 USC 119(e) of U.S. Provisional Patent Application 61/439,124 filed Feb. 3, 2011, entitled SIDE PUMP FIBER, METHOD OF MAKING SAME, AND OPTICAL DEVICES USING SAME, the contents of which is hereby incorporated by reference in its entirety.

FIELD OF INTEREST

The present inventive concepts relate to the field of fiber optics, and more particularly to the field of cladding-pumped fibers.

BACKGROUND

A typical cladding-pumped fiber device comprises a single-mode core and a plurality of cladding layers. The inner cladding surrounding the core is typically a silica cladding of large cross-sectional area (as compared to the core) and high numerical aperture (NA). It is usually non-circular (e.g., rectangular or star-shaped) to ensure that the modes of the inner cladding will have good overlap with the core. The outer cladding is commonly composed of a low refractive index polymer. The index of the core is greater than that of the inner cladding which, in turn, is greater than the outer cladding.

A major advantage of the cladding pumped fiber is that it can convert light from low-brightness sources into light of high brightness in a single mode fiber. Light from low-brightness sources, such as diode arrays, can be coupled into the inner cladding due to its large cross-sectional area and high NA. In a cladding pumped laser or amplifier the core is doped with a rare earth such as Er. The light in the cladding interacts with the core and is absorbed by the rare-earth dopant. If an optical signal is passed through the pumped core, it will be amplified. Or if optical feedback is provided (as by providing a Bragg grating optical cavity), the cladding-pumped fiber will act as a laser oscillator at the feedback wavelength.

U.S. Pat. No. 5,864,644 to DiGiovanni et al. teaches that light is coupled from a plurality of semiconductor emitters to a cladding-pumped fiber via a tapered fiber bundles fusion spliced to the cladding-pumped fiber. Individual semiconductor broad stripe emitters can be coupled to individual multi-mode fibers. The individual fibers can be bundled together in a close-packed formation, heated to melting temperature, drawn into a taper and then fusion spliced to the cladding-pumped fiber. The taper is then over-coated with cladding material, such as low index polymer. In addition, a fiber containing a single-mode core can be included in the fiber bundle. This single-mode core can be used to couple light into or out of the single-mode core of the cladding-pumped fiber.

FIGS. 1-5 demonstrate an existing approach to making a side pumped fiber, which is consistent with the description in U.S. Pat. No. 5,864,644. In this example, 9 outer fibers A are combined with a center signal fiber. More specifically, FIG. 1 shows that nine 200/220 µm (0.22 NA) pump fibers A are disposed around a 420 µm mandrel B, which is used as a spacer. The ends of the nine fibers A are polished, using an off-the-shelf polishing machine C, to create a flat face—or fibers having the same length, see FIG. 2.

In FIG. 3, the polished ends of the nine fibers A are spliced to a fused silica capillary tube D. The capillary tube is hollow, and has an inner diameter of 405 µm and an outer diameter of 900 µm. In FIG. 4, the capillary tube is tapered with hydrofluoric acid until the inner and outer diameters are about the same. Prior to this step, a plug can be inserted in the center of the hollow capillary tube D, such that the taper goes from the outer diameter to the inner diameter at the plug E. The capillary tube D can then be used as a combiner.

In FIG. 5, the plug E is removed and a 400 µm signal fiber F is inserted through the hollow center of the capillary tube D, and through the nine outer fibers A. As a result, the nine outer fibers A surround the center signal fiber F. Pump laser light from the outer fibers A is side pumped into the signal fiber F within the capillary tube (or combiner) D. Optically, this can work well. However, for each pump fiber A, two (2) junctions exist at the combiner D, the pump fiber A to the combiner D and the combiner D to the signal fiber F. Each junction experiences some optical loss and generates heat. Since light from nine different source fibers A is pumped into the signal fiber F at the combiner D, there are many junctions at the combiner D, all generating heat. This can cause a hotspot at the combiner D. Also, this approach in not particularly scalable, since only a fixed number of pump fibers A can be used with such combiners D.

SUMMARY OF INVENTION

In accordance with one aspect of the invention, provided is a method of making a side pump fiber apparatus. The method comprises making a lengthwise, tapered, concave pocket cut in a pump fiber, inserting a signal fiber into the pocket cut, and coupling the pocket cut of the pump fiber to the signal fiber, e.g., a cladding of the signal fiber.

In various embodiments, the method can further comprise coupling a plurality of pump fibers to the signal fiber by repeating the method steps above for each pump fiber in the plurality of pump fibers.

In various embodiments, the method can further comprise coupling at least two of the plurality of pump fibers to the signal fiber at different locations along a length of the signal fiber.

In various embodiments, the coupling can comprise fusion splicing the pump fiber to a cladding of the signal fiber at the pocket cut.

In various embodiments, the signal fiber can be a single mode fiber.

In various embodiments, the method can further comprise maintaining a diameter of the signal fiber constant at the coupling with the pump fiber.

In various embodiments, the method can further comprise making the pocket cut at a pocket cut angle greater than 0 degrees and not more than about 10 degrees.

In various embodiments, the method can further comprise making the pocket cut angle at about 2 degrees.

In various embodiments, the method can further comprise making the pocket as a concave cut that is slightly off axis.

In various embodiments, the method can further comprise making the pocket cut to have a length more than 0 mm and not more than about 10 mm.

In various embodiments, the method can further comprise making the pocket cut by cutting the pump fiber using a CO2 laser.

In various embodiments, the method can further comprise making the pocket cut by cutting the pump fiber using a diamond wire saw.

In accordance with another aspect of the invention, provided is a method of making a side pump fiber apparatus. The method comprises making a lengthwise, tapered, concave pocket cut in each of a plurality of pump fibers, for each pump fiber, inserting a center fiber into the pocket cut, and coupling the pocket cut of each pump fiber to a side of the center fiber, including splicing at least two of the plurality of pump fibers to the center fiber at different locations along a length of the center fiber.

In accordance with another aspect of the invention, provided is a side pump fiber apparatus. The apparatus comprises a signal fiber and a pump fiber having formed therein a lengthwise, tapered, concave pocket cut, wherein the pump fiber is coupled to a cladding of the signal fiber.

In various embodiments, the apparatus can further comprise a plurality of pump fibers having pocket cuts formed therein, each of the plurality pump fibers coupled to the signal fiber, wherein at least two of the plurality of pump fibers are coupled to the signal fiber at different locations along a length of the signal fiber.

In various embodiments, the pump fiber can be fusion spliced to a cladding of the signal fiber at the pocket cut.

In various embodiments, the signal fiber can be a single mode fiber.

In various embodiments, the pocket cut can be cut at an angle greater than 0 degrees and not more than about 10 degrees.

In various embodiments, the pocket cut angle can be about 2 degrees.

In various embodiments, the pocket cut can be a concave cut that is slightly off axis.

In various embodiments, the pocket cut can have a length greater than 0 mm and not more than about 10 mm.

In various embodiments, the signal fiber can be doped with rare-earth elements, including at least one of erbium, ytterbium, neodymium, dysprosium, praseodymium, and thulium.

In various embodiments, the side pump fiber can form a doped fiber amplifier.

In various embodiments, the side pump fiber can form a fiber laser.

In accordance with one aspect of the present disclosure, provided is a method of making a side pump fiber and optical devices using the same, such a optical amplifiers and lasers. Accordingly, a plurality of fibers can be joined to a side of a center fiber, at different locations. The method includes creating a lengthwise, tapered, and concave pocket cut in a pump fiber, inserting the center fiber in the pocket cut, and then fusing the pump fiber to the center fiber at the pocket cut.

In various embodiments, the plurality of fibers can be fusion spliced to a cladding of the center fiber.

In accordance with the method, the diameter of the center fiber is unchanged.

In various embodiments, the center fiber can be a signal fiber.

In various embodiments, an angle of the tapered pocket cut can be about 1°-10°, and is preferably about 2°. Other angles could be possible.

In various embodiments, an angle between the pump fiber and the center fiber can, therefore, also be about 2°.

In various embodiments, the method can include combining a plurality of pump fibers to the center fiber, wherein the pump fibers are spaced apart lengthwise on the center fiber.

In various embodiments, each of the plurality of pump fibers can be fused to an innermost cladding of the center fiber.

In various embodiments, the pocket cut can be a concave cut that is slightly off axis.

In various embodiments, the pocket diameter can have an outer diameter of up to about 220 μm and an inner diameter of up to about 200 μm.

In various embodiments, a length of the pocket cut can be about several millimeters, e.g. about 2 mm-10 mm. In some case, it may be preferable to have the pocket cut be in a range of about 4 mm-6 mm in length. Other lengths could be possible.

In various embodiments, the pocket cut can be formed by cutting the pump fiber using a $CO_2$ laser.

Alternatively, in various embodiments, the pocket cut can be formed using a diamond wire saw that is pressed against the pump fiber at a predetermined angle. The diamond wire saw can include a steel wire coated with diamond dust. A diameter of the diamond saw can be about 80 mm.

BRIEF DESCRIPTION OF THE DRAWINGS

The present invention will become more apparent in view of the attached drawings and accompanying detailed description. The embodiments depicted therein are provided by way of example, not by way of limitation, wherein like reference numerals refer to the same or similar elements. The drawings are not necessarily to scale, emphasis instead being placed upon illustrating aspects of the invention. In the drawings:

FIGS. 1-5 demonstrate a prior art approach to making a side pumped fiber;

DETAILED DESCRIPTION OF PREFERRED EMBODIMENT

Figure 1:
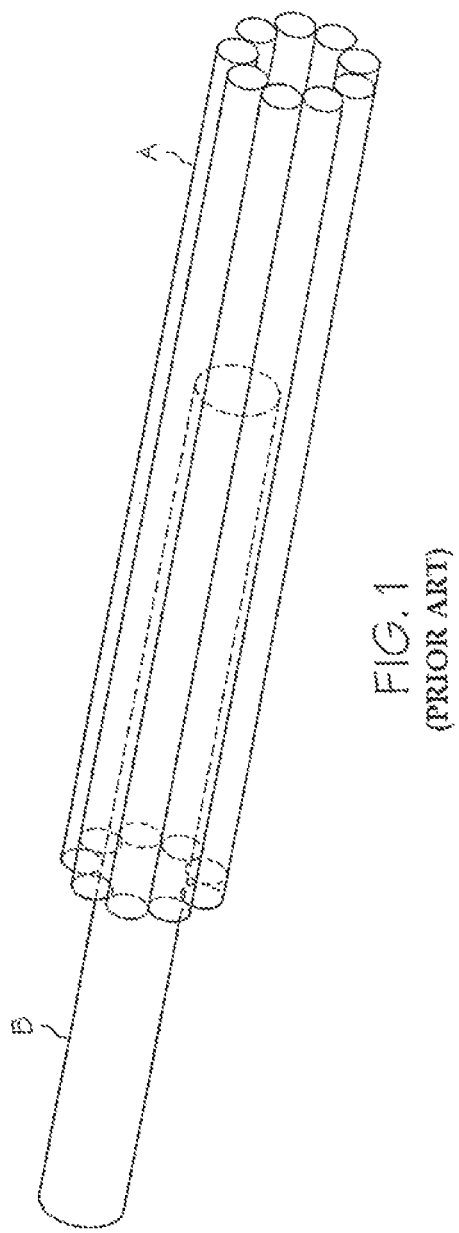
Figure 2:
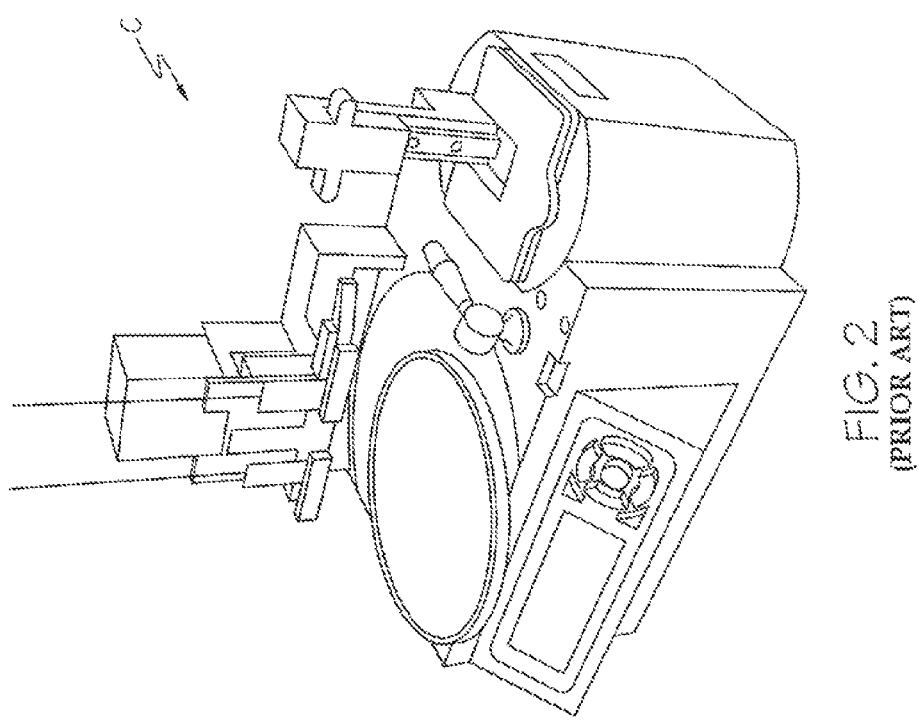
Figure 5:
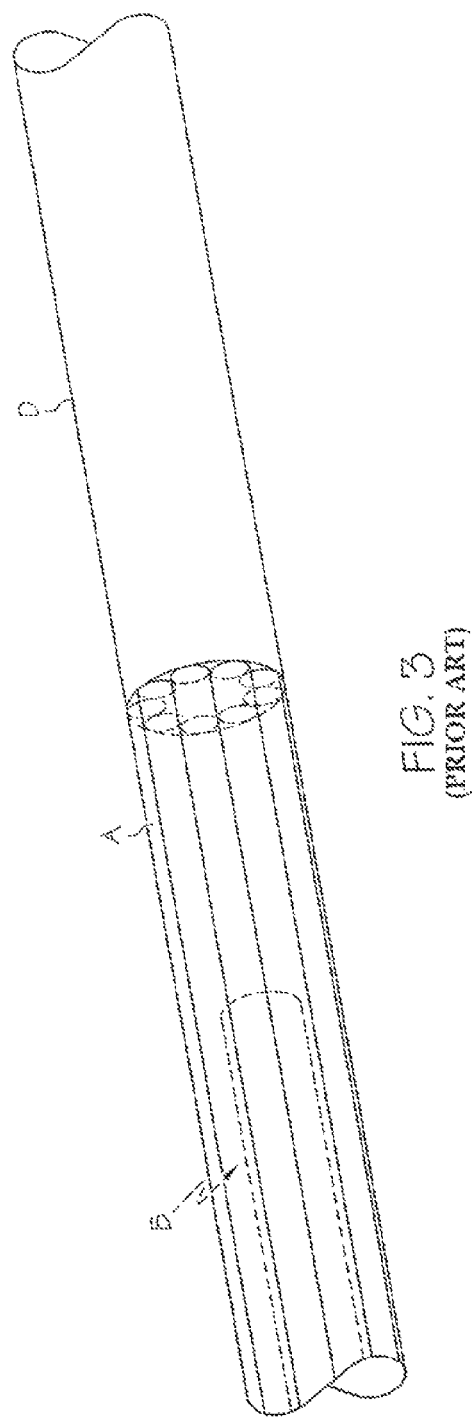
Figure 4:
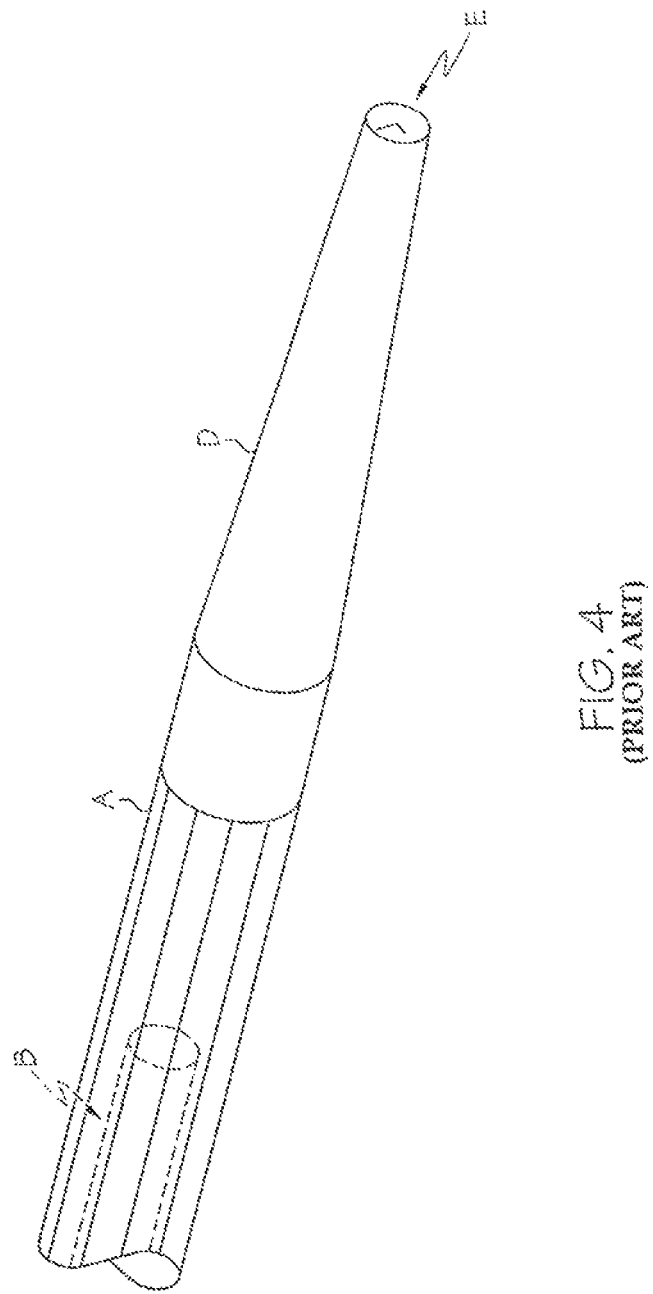
Figure 5:
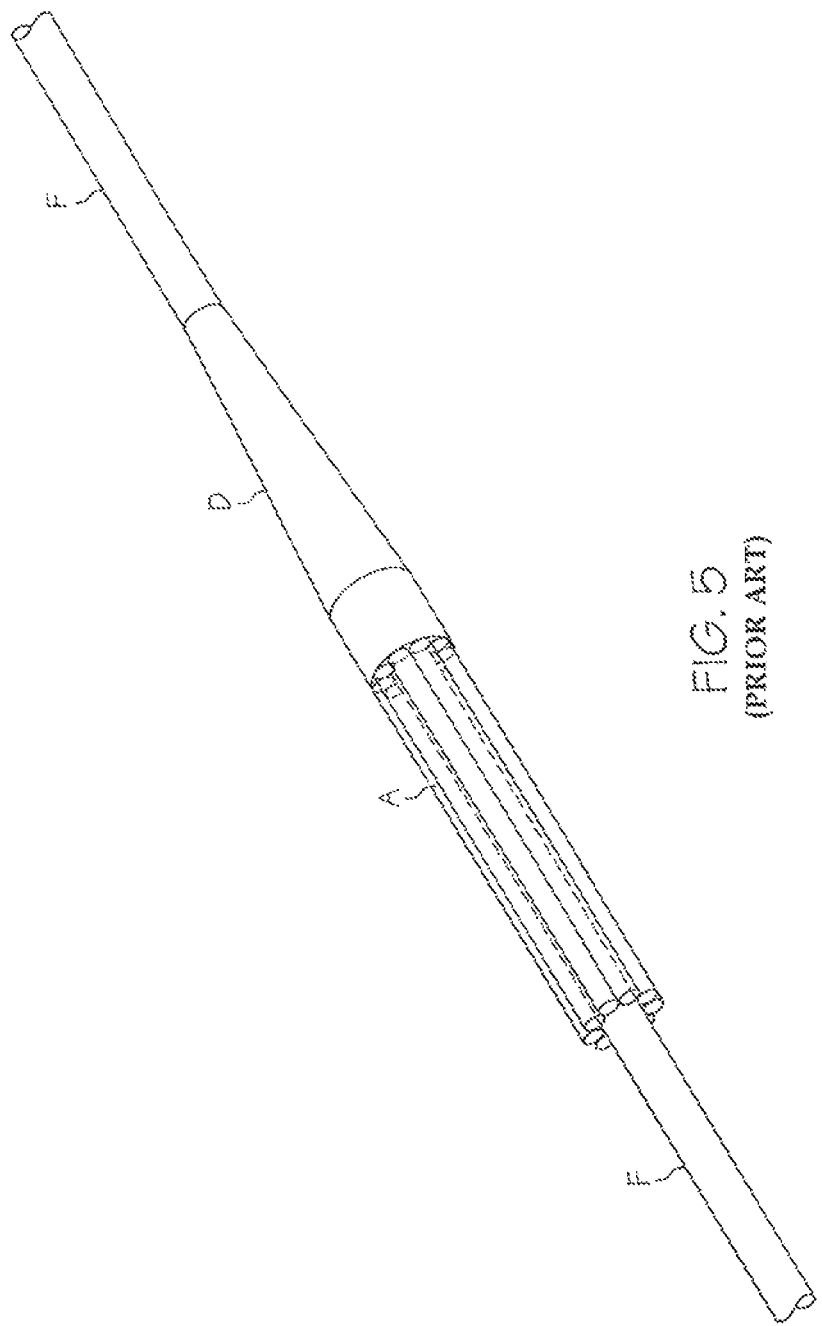

Hereinafter, aspects of the present invention will be described by explaining illustrative embodiments in accordance therewith, with reference to the attached drawings. While describing these embodiments, detailed descriptions of well-known items, functions, or configurations are typically omitted for conciseness.

It will be understood that, although the terms first, second, etc. are be used herein to describe various elements, these elements should not be limited by these terms. These terms are used to distinguish one element from another, but not to imply a required sequence of elements. For example, a first element can be termed a second element, and, similarly, a second element can be termed a first element, without departing from the scope of the present invention. As used herein, the term "and/or" includes any and all combinations of one or more of the associated listed items.

It will be understood that when an element is referred to as being "on" or "connected" or "coupled" to another element, it can be directly on or connected or coupled to the other element or intervening elements can be present. In contrast, when an element is referred to as being "directly on" or "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, steps, operations, elements, and/or components, but do not preclude the presence or addition of one or more other features, steps, operations, elements, components, and/or groups thereof.

Spatially relative terms, such as "beneath," "below," "lower," "above," "upper" and the like may be used to describe an element and/or feature's relationship to another element(s) and/or feature(s) as, for example, illustrated in the figures. It will be understood that the spatially relative terms are intended to encompass different orientations of the device in use and/or operation in addition to the orientation depicted in the figures. For example, if the device in the figures is turned over, elements described as "below" and/or "beneath" other elements or features would then be oriented "above" the other elements or features. The device may be otherwise oriented (e.g., rotated 90 degrees or at other orientations) and the spatially relative descriptors used herein interpreted accordingly.

A side pump fiber, a method of making a side pump fiber, and optical devices using same are provided. A plurality of pump fibers can be joined to a side of a signal fiber, at various locations along the signal fiber. The method includes creating or making a lengthwise, tapered, concave pocket cut in a pump (or side pump) fiber, inserting the signal fiber into the pocket cut, and then coupling the side pump fiber to the signal fiber at the pocket cut. The coupling can occur by fusing the pump fiber to the signal fiber.

FIGS. 6A-E show five different views of a side pump fiber 10 that has a pocket cut 20, in accordance with aspects of the present invention. Consider FIG. 6A to be a top view of side pump fiber 10 with pocket cut 20 (or pocket 20) formed therein. As is shown, pocket cut 20 is a relatively long angled cut that tapers from an end of the fiber (deep cut) back toward the rest of the fiber (shallow cut). Pocket 20 is formed to accommodate a formfitting coupling with a center signal fiber (see FIGS. 7-9). The two fibers are coupled, e.g., fusion spliced, over the length of pocket cut 20, or at least a portion thereof.

FIG. 6B shows a rear perspective view of side pump fiber 10 and FIG. 6C is a side perspective view. These views show that the pocket 20 is a tapered, concave pocket, cut at an angle relative to the fiber, or its central axis. This is further indicated in the side view of FIG. 6D, where the pocket cut 20 is shown by dashed lines. FIG. 6E shows an end view. The tapered pocket cut 20 is also apparent from this view. A side pump fiber having this type of pocket cut can be coupled (e.g., by fusion) to a center signal fiber, which provides an approach to amplifying the signal in the signal fiber or creating a laser.

A fiber laser is a laser in which the active gain medium is an optical fiber doped with rare-earth elements, such as erbium, ytterbium, neodymium, dysprosium, praseodymium, and thulium. They are related to doped fiber amplifiers, which provide light amplification without lasing. A doped fiber amplifier includes a center signal fiber that is doped as described above, where light from the side pump fibers excites photons within the center fiber to increase their energy level.

A prior art combiner is not needed with the present invention, since a plurality of side pump fibers having the subject pocket cut 20 can be directly fusion spliced to the cladding of the center signal fiber. Prior art combiners have a predetermined input fiber to output fiber ratio, e.g., 9:1 in FIGS. 1-5. However, no such limitation exists in accordance with the present invention. As many or as few pocket cut side pump fibers as desired can be coupled to a center signal fiber.

Also, using the present invention, a junction problems, such as heat and loss, described with respect to the coupler of the prior art are eliminated, or at least substantially eliminated. This is an important advancement over the prior art. Since each junction between fibers presents an opportunity for loss, and resulting heat generation, elimination of junctions provides significant and tangible benefits. For instance, using the present invention there is only 1 junction between a side pump fiber 10 and a signal fiber 50—which is where they are fusion spliced. But using a prior art combiner, there are two junctions for each pump fiber, one between the pump fiber and the combiner and one between the combiner and the signal fiber. As a result, the prior art combiner creates a hotspot at the combiner because, not only does it have 2 junctions per pump fiber, all of the junctions happen in the same place—at the combiner, with each junction resulting in heat generation.

In contrast, the present invention couples pump fibers to the signal fiber at different places, and with fewer junctions. Since the couplings are spaced out, as opposed to being located all together using a combiner, whatever heat that is generated between a pump fiber and signal fiber in the present invention is widely distributed over a length of the center fiber. Thus, hotspots can be avoided in accordance with the present invention.

Figure 6:
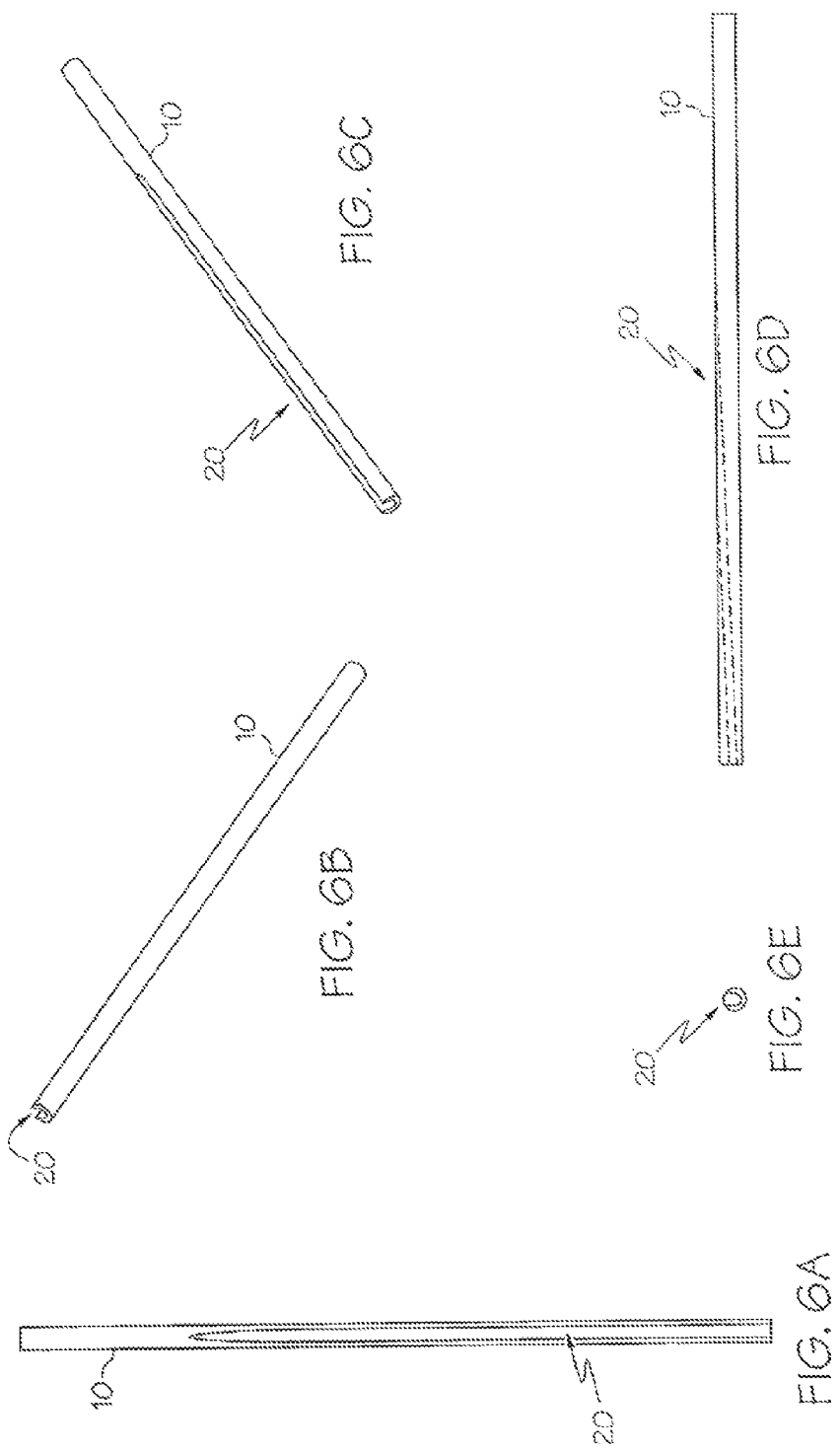
FIGS. 6A-6E show five different views of a side pump fiber that has a pocket cut, in accordance with aspects of the present invention.
Figure 7:
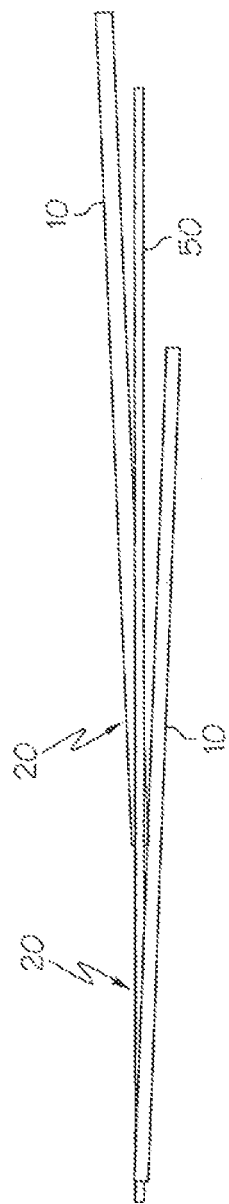
FIG. 7 is a side view of an embodiment of two side pump fibers (e.g., as in FIGS. 6A-6E) coupled to a center signal fiber, in accordance with aspects of the present invention.

FIG. 7 is an embodiment of two side pump fibers 10 (as in FIGS. 6A-6E) coupled to a center signal fiber 50. Side pump fibers 10 can be directly coupled to signal fiber 50 by fusion splicing, as an example, without a combiner. As is shown, a plurality of pump fibers 10 are coupled to the signal fiber 50, wherein the pump fibers are spaced apart lengthwise on the signal fiber 50.

Each of the plurality of pump fibers 10 can be fused to an innermost cladding of the center fiber, e.g., in the case of double clad fibers. The center signal fiber 50 here is a single mode fiber, and its diameter is not reduced at or near the point of coupling with the side pump fiber 10, in accordance with aspects of the present invention. This in an improvement, for example, over the approach in U.S. Pat. No. 5,864,644, which does reduce the diameter of the signal fiber. Single mode fiber 50 can be doped as described above, e.g., with a rare earth dopant such as Er.

Figure 8:
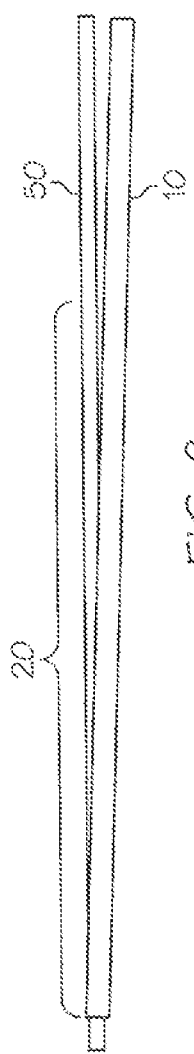
FIGS. 8 and 9 are side views of an embodiment that show further details with respect to coupling of a side pump fiber with a signal fiber of FIG. 7, in accordance with aspects of the present invention.
Figure 9:
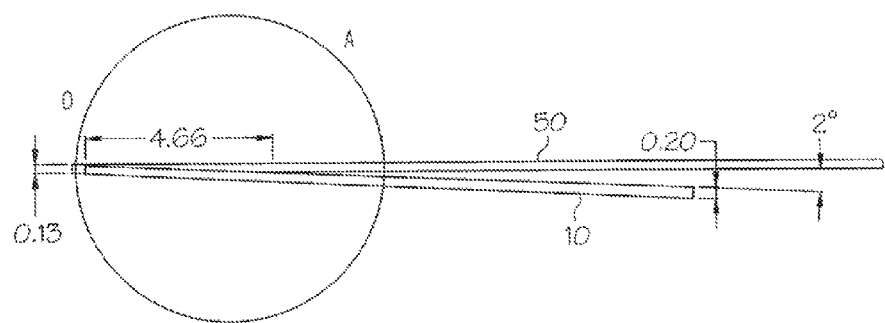

FIGS. 8 and 9 show further details with respect to coupling of side pump fiber 10 with signal fiber 50, in the illustrative embodiment of FIGS. 6A-7. FIG. 9 shows dimension information for area A from FIG. 8, for this embodiment. An angle of the tapered pocket cut is 2° in this embodiment, but the invention is not limited to this particular angle. Accordingly, an angle between the pump fiber 10 and the center signal fiber 50 can also be about 2°.

The pocket cut 20 is a concave cut that can be slightly off axis, e.g., less than about 10%. In this embodiment, the pocket 20 diameter has an inner diameter of 200 μm and an outer diameter of 220 μm. In this embodiment, center signal fiber 50 has an outer diameter 130 μm. A length of the pocket cut 20 can be about several millimeters. In this embodiment, the length of pocket 20 is about 4.66 mm. The fibers 10 and 50 can be heated at pocket 20 to splice the two together, using know splicing systems and methods.

Pocket 20 can be formed in different ways. In a first embodiment, pocket cut 20 can be formed by cutting the pump fiber 10 using a $CO_2$ laser. Here, the pump fiber 20 must be stably positioned, a desired angle between the laser beam and the fiber must be established, and then the laser can contact the fiber to precisely make the cut, at the desired angle and dimension (e.g., diameter). For these purposes, the fiber can be secured in a fiber holder, with fiber holding clamps.

Alternatively, the pocket cut can be formed using a diamond wire saw that is applied, in a sawing motion, to the pump fiber at a predetermined angle. The diamond wire saw can include a steel wire coated with diamond dust. A diameter of the diamond saw can be about 80 mm, as an example, for making pocket cut 20 in fiber 10 discussed as an example above. In this embodiment, the fiber can also be secured in a fiber holder, having fiber holding clamps.

Figure 10:
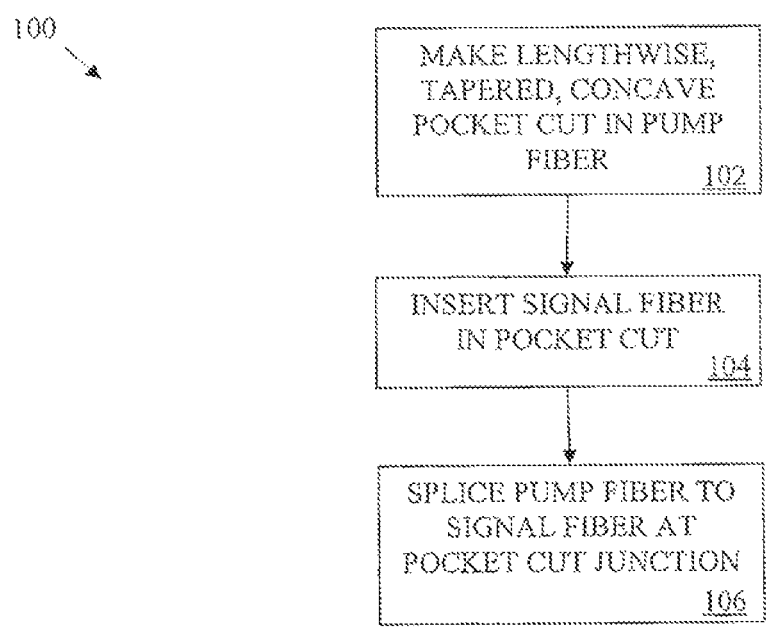
FIG. 10 is a flowchart depicting an embodiment of a method of creating an optical device with pocket cut side pump fibers, in accordance with aspects of the present invention.

FIG. 10 is a flowchart depicting an embodiment of a method 100 of creating an optical device (e.g., amplifier or laser) with pocket cut side pump fibers, in accordance with aspects of the present invention. In step 102, a lengthwise, tapered, and concave pocket cut is made in a pump fiber, as described above. The cut is made at a predetermined angle α, e.g., where $0 < α \leq 10°$. Other angles beyond 10° could be used on other embodiments. A signal fiber is inserted into the pocket cut, in step 104. The pump fiber and signal fiber are spliced together at the pocket cut, in step 106. The angle of the side pump fiber and center signal fiber could be α, or about α. The spliced area could then be over-coated using known or hereafter developed coating techniques.

While the foregoing has described what are considered to be the best mode and/or other preferred embodiments, it is understood that various modifications can be made therein and that the invention or inventions may be implemented in various forms and embodiments, and that they may be applied in numerous applications, only some of which have been described herein. It is intended by the following claims to claim that which is literally described and all equivalents thereto, including all modifications and variations that fall within the scope of each claim.

What is claimed is:

1. A side pump fiber apparatus, comprising:
   a signal fiber; and
   at least one pump fiber having formed therein a lengthwise, tapered, concave pocket cut,
   wherein the at least one pump fiber is spliced to a cladding of the signal fiber.

2. The apparatus of claim 1, wherein:
   The at least one pump fiber is a plurality of pump fibers having pocket cuts formed therein, each of the plurality pump fibers spliced to the signal fiber, wherein at least two of the plurality of pump fibers are spliced to the signal fiber at different locations along a length of the signal fiber.

3. The apparatus of claim 1, wherein the pump fiber is fusion spliced to a cladding of the signal fiber at the pocket cut.

4. The apparatus of claim 1, wherein the signal fiber is a single mode fiber.

5. The apparatus of claim 1, wherein the pocket cut is cut at an angle greater than 0 degrees and not more than about 10 degrees.

6. The apparatus of claim 5, wherein the pocket cut angle is about 2 degrees.

7. The apparatus of claim 1, wherein the pocket cut is a concave cut that is slightly off axis.

8. The apparatus of claim 1, wherein the pocket cut has a length greater than 0 mm and not more than about 10 mm.

9. The apparatus of claim 1, wherein the signal fiber is doped with rare-earth elements, including at least one of erbium, ytterbium, neodymium, dysprosium, praseodymium, and thulium.

10. The apparatus of claim 1, wherein the side pump fiber forms a doped fiber amplifier.

11. The apparatus of claim 1, wherein the side pump fiber forms a fiber laser.

* * * * *

UNITED STATES PATENT AND TRADEMARK OFFICE
CERTIFICATE OF CORRECTION

| | | |
|---|---|---|
| PATENT NO. | : 8,979,396 B2 | Page 1 of 1 |
| APPLICATION NO. | : 14/511552 | |
| DATED | : March 17, 2015 | |
| INVENTOR(S) | : Robert G. Wiley | |

It is certified that error appears in the above-identified patent and that said Letters Patent is hereby corrected as shown below:

In the Claims

Column 8, line 12, Please delete the word "The" and insert the word --the--

Column 8, line 13, Please insert --of-- after the word plurality

Signed and Sealed this
Twentieth Day of October, 2015

Michelle K. Lee
*Director of the United States Patent and Trademark Office*